Patented Apr. 17, 1951

2,549,453

UNITED STATES PATENT OFFICE

2,549,453

ANHYDRIDE SYNTHESIS

William F. Gresham and Richard E. Brooks, Wilmington, Del., assignors to E. I. du Pont de Nemours & Company, Wilmington, Del., a corporation of Delaware No Drawing. Application February 28, 1947, Serial No. 731,706

10 Claims. (Cl. 260—546)

This invention relates to the synthesis of organic compounds and particularly to the preparation of organic carboxylic acid anhydrides by the interaction of olefinic substances, carbon monoxide, and carboxylic acids or substances which yield carboxylic acids under the reaction conditions. This application is a continuation-in-part of our copending application S. N. 630,540, filed November 23, 1945, now Patent No. 2,497,304.

Various processes have been proposed heretofore for the preparation of organic carboxylic acid anhydrides. For example, acetic anhydride has been prepared by pyrolysis of ethylidene diacetate, or by the direct high temperature dehydration of acetic acid. Other anhydrides have been prepared by reaction between acetic anhydride and the corresponding organic carboxylic acid.

An object of the present invention is to provide a novel process for the synthesis of organic carboxylic acid anhydrides from relatively inexpensive starting materials. A further object of the invention is to provide a commercially feasible process for the synthesis of organic carboxylic acid anhydrides employing olefins and carbon monoxide as starting materials. Other objects and advantages of the invention will appear hereinafter.

It has been discovered, in accordance with the invention, that organic carboxylic acid anhydrides, and, in particular embodiments, carboxylic acid anhydrides of aliphatic acids, can be prepared by reaction between unsaturated compounds containing the non-aromatic olefinic grouping $>C=C<$, carbon monoxide and carboxylic acids. The said carboxylic acids may be produced, at least in part, in situ from substances which yield the same. Thus, the invention contemplates the synthesis of acid anhydrides by introducing into a reaction vessel carbon monoxide, water and an olefinic compound, in such quantities that the olefinic compound and carbon monoxide are both present in excess of the amount needed for conversion of all of the water to carboxylic acid, and heating the resulting mixture at a temperature above about 110° C. under superatmospheric pressure, preferably in the presence of a catalyst of the class consisting of cobalt-containing and nickel-containing catalysts, whereby an organic carboxylic acid anhydride is formed, and separating organic carboxylic acid anhydride from the resulting mixture.

The unsaturated compounds which may be employed in the practice of the invention includes the olefinic hydrocarbons, such as, for example, ethylene, propylene, the butylenes, etc. These hydrocarbons may be represented by the formula: $RR_1C=CR_2R_3$, in which $R$, $R_1$, $R_2$ and $R_3$ represent hydrogen or an alkyl, aryl, or aralkyl radical. The reaction also takes place with certain compounds containing aromatic unsaturation, such as naphthalene.

The following equation illustrates a reaction which takes place when a carboxylic acid anhydride is produced from an olefine, carbon monoxide, and a carboxylic acid of the formula, $R_4COOH$, $R_4$ representing alkyl, aryl, or aralkyl groups:

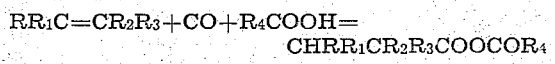

The isomeric mixed anhydride,

also is produced, as well as the two simple anhydrides, which are formed to some extent by disproportionation. In a specific embodiment, ethylene reacts with carbon monoxide and propionic acid to form propionic anhydride in substantially the following manner:

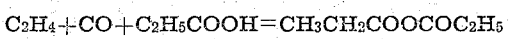

propylene and butylene similarly react with propionic acid to form the corresponding anhydrides, respectively. By utilizing other aliphatic carboxylic acids than propionic acid, numerous organic carboxylic acid anhydrides can be prepared, such, for example, as the following: carbon monoxide reacting with formic acid and ethylene to give formic propionic anhydride; carbon monoxide reacting with acetic acid and ethylene to give a mixed acetic propionic anhydride; carbon monoxide reacting with propylene and butyric acid to give butyric anhydride; carbon monoxide reacting with isobutylene and isovaleric acid to give isovaleric anhydride, etc.

When the carboxylic acid reactant is produced in situ, the overall reaction may be written as follows:

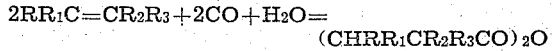

Raw materials suitable for use in the process are readily available from a number of sources. Thus, ethylene and various homologs thereof are found in the gases evolved in cracking petroleum and may be seperated therefrom, for example, by fractional liquefaction. It is preferable, for the sake of avoiding undesirable by-products, that the hydrocarbon which it is desired to convert be employed in a relatively high degree of purity. However, hydrocarbon mixtures, containing saturated hydrocarbons as well as olefins, such as may be obtained by cracking and/or dehydrogenation, may be used if desired. Diolefins, cycloolefins, and substituted olefins are also generally applicable in the practice of the invention.

It is, in general, desirable that neither the carboxylic acid, nor the olefinic reactant contain substituent groups (such as alcoholic hydroxyls) which react secondarily with the anhydride produced, for this results in a loss of anhydride. Other substituent groups may, of course, be present without causing such a loss in yield.

The carbon monoxide required for the synthesis may be conveniently derived from various commercial sources, such as, for example, water gas, producer gas, etc., by liquefaction, or by other methods, and should, likewise, for the best results, be relatively pure, although in specific embodiments, small amounts of hydrogen have a beneficial effect. The latter effect is probably due to activation of the catalyst. In specific instances for example, hydrogen evidently suppresses the reaction of nickel carbonyl with propionic acid to form nickel propionate, and, on the other hand, facilitates the formation of nickel carbonyl from nickel propionate and carbon monoxide.

Inert gases, such as nitrogen, methane, etc., may be included with the reactants, this being advantageous in some cases from the standpoint of controlling the temperature of the exothermic reaction and limiting the extent thereof, for it may be desired to restrict the overall conversion of the reaction for the sake of enhancing the relative yield of the desired carboxylic acid anhydrides.

The relative proportions of the reactants can be varied. Under certain circumstances it is desirable to employ an excess of carbon monoxide to avoid side reactions, but ordinarily such side reactions are not particularly troublesome. Outstanding results are thus obtainable when the initial mol ratio of CO:olefin:carboxylic acid is within the range defined by the following limits: 0.3:0.3:1, 30:30:1, 30:0.3:1, 0.3:30:1. It is to be understood of course that at least part of the said carboxylic acid can be replaced by an equivalent weight of water, olefin and carbon monoxide in every instance.

The use of pressure in excess of atmospheric, say from 25 to 2000 atmospheres, is preferred, although somewhat higher pressures may, if desired, be used. In general the rate of the reaction at relatively low pressure is proportional to the amount of pressure employed, so that at atmospheric pressure, or at pressures only slightly above atmospheric, an unusually long reaction period is required. The reaction is quite rapid at pressures as low as 150 atmospheres (temperature, 245° C.), if a sufficient quantity of catalyst is used. It is preferred to operate at pressures of about 300 to 1500 atmospheres, because the yield of anhydride is higher within this range than it is at still higher pressures, and, in fact, reaches a well-defined maximum at an intermediate pressure within the said range. This maximum increases with increased reaction temperature and with decreased concentration of carbon monoxide in the reaction mixture.

Generally, the desired reaction can be obtained at temperatures of about 200° to 500° C., but temperatures as low as 110° C. are effective if a sufficiently long reaction time is used. From the standpoint of practical operation, the temperature should not be so low that the reaction rate is not economical, nor so high as to result in undesirable by-products by decomposition and/or polymerization of the raw material. From this point of view, the process has been found to operate very satisfactorily at 200° to 350° C.

The invention is preferably practiced by heating the reactants in the presence of a suitable catalyst under the aforesaid conditions of temperature and pressure. Numerous materials have been found to be effective as catalysts, particularly various salts, oxides, hydroxides, metals and metal carbonyls. However, outstanding results are obtained with catalysts containing nickel. Nickel carbonyls or substances which give rise to the carbonyls under the conditions of the reaction (such as water-soluble salts of organic carboxylic acids) are preferred catalysts. Excellent results have been obtained, for example, in the synthesis of propionic anhydride by heating propionic acid with ethylene and carbon monoxide in the presence of nickel propionate. Inert supports for these catalysts may be used if desired. The nickel-containing catalysts are so active that only very minute quantities are generally required, although of course very large amounts may be present if desired. Quantities of metal carbonyl sufficiently large to serve as a source of the carbon monoxide may be used, but this is neither necessary nor desirable.

When nickel carbonyl is used as the catalyst in the practice of the invention, it may be recovered by stripping, e. g. by sweeping it from the mixture with a stream of carbon monoxide, followed by adsorption of the carbonyl in a solvent such as propionic acid. The recovered catalyst may, of course, be reused.

The following examples will illustrate methods of practicing the invention, although the invention is not limited thereto. It is to be understood that the carboxylic acid reactant can be replaced at least in part by the stoichiometrically equivalent quantity of water, olefin and carbon monoxide.

*Example 1.*—A mixture containing 74 grams of propionic acid, 10 grams of nickel carbonyl and 28 grams of ethylene was heated in a copper-lined pressure resistant vessel with carbon monoxide at a temperature of 272° to 293° C., under a pressure of 600 to 810 atmospheres for 15 minutes. Distillation of the resulting product showed 39% conversion to propionic anhydride, and 93% yield, based on the weight of propionic acid initially present.

*Example 2.*—A mixture containing 18 grams of water, 5 grams of nickel carbonyl and 56 grams of ethylene was processed with CO at a temperature of about 280° C. under a pressure of about 800 atmospheres. The liquid product contained propionic anhydride.

*Example 3.*—A mixture of 60 grams of acetic acid, 28 grams of ethylene and 20 grams of nickel carbonyl was processed with carbon monoxide at 445 to 805 atmospheres pressure at 250° to 275° C. Liquid product was distilled and found to contain a quantity representing 43.8% conversion and essentially quantitative yield of the anhydrides and mixed anhydride of propionic and acetic acids.

*Example 4.*—A mixture of 74 grams of propionic acid, 28 grams ethylene, and 10 grams nickel formate was processed with carbon monoxide at a temperature of 285° to 303° C. under a pressure of 500 to 850 atmospheres for 1 hour. The liquid product was distilled and found to contain propionic anhydride representing 20% conversion based on propionic acid charged.

*Example 5.*—A mixture containing 32 grams of naphthalene, 20 grams of nickel carbonyl, 74 grams of propionic acid processed with carbon monoxide at a temperature of 290° to 300° C. under a pressure of 750 to 800 atmospheres for 30 minutes. The resulting product containing considerable unreacted naphthalene was dissolved in ether and the ether solution extracted with dilute sodium hydroxide solution. Acidification of this alkaline solution caused precipitation of a small amount of an acid M. P. 177–178°, neutral equivalent 179. This acid is regarded as having the following structure (neutral equivalent, 174):

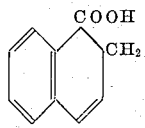

The isolation of this acid indicated that the reaction mixture had contained the mixed anhydride of this acid with propionic acid.

*Example 6.*—A mixture containing 74 grams of propionic acid, 10 grams of nickel propionate and 28 grams of ethylene was heated for 15 minutes at a temperature of 275° to 295° C., under a carbon monoxide pressure of 590 to 810 atmospheres. Distillation of the resulting product gave 52 grams, B. P. 124° to 142° C.; 11 grams, B. P. 142° to 160° C.; and, 23 grams, B. P. 160° to 167° C. Analysis of the second and third fractions showed the presence of propionic anhydride, corresponding to 22.5% conversion and 97% yield, based on the amount of propionic acid initially employed.

*Example 7.*—A mixture containing 74 grams of propionic acid, 28 grams of ethylene and 5 grams of nickel carbonyl was heated at a temperature of 275° to 290° C. for 20 minutes in a copper-lined shaker tube, under a carbon monoxide pressure of 700 to 820 atmospheres. Distillation of the resulting product gave a propionic anhydride fraction which corresponded to 28.4% conversion, and 92.5% yield, based on the amount of propionic acid employed.

*Example 8.*—Example 1 was repeated using propylene as the olefinic hydrocarbon in place of ethylene. A comparatively low yield of mixed butyric, isobutyric and propionic anhydrides was obtained, in place of propionic anhydride.

*Example 9.*—A reaction mixture consisting of carbon monoxide, ethylene, propionic acid and $Ni(CO)_4$ in the molar ratio of 0.5:0.36:1.0:0.11 was passed continuously through a copper-lined converter at 263° C. under a pressure of about 605 atmospheres, the contact time being 4.9 minutes. Analysis of the effluent showed that 72% of the ethylene was converted to propionic anhydride at a yield of about 88.6%; 26.2% of the propionic acid was converted to propionic anhydride in essentially quantitative yield. The space-time yield of propionic anhydride was 183 pounds per cubic foot per hour. By-product formation amounted to only 2.8 grams of non-volatile material per 100 grams of propionic anhydride produced.

*Example 10.*—A reaction mixture consisting of carbon monoxide, ethylene, propionic acid and $Ni(CO)_4$ in the molar ratio of 10.1:4.7:1:0.461 was passed continuously through a silver-lined tubular converter at a temperature of 303° C. and a pressure of about 1000 atmospheres, the contact time being about 2.4 minutes. Analysis of the effluent showed that 8.6% of the ethylene had been converted to propionic anhydride at 83.2% yield; 40.4% of the propionic acid was converted to propionic anhydride. The rate of production of propionic anhydride amounted to 102 pounds per cubic foot of converter volume per hour. About 4.4 grams of non-volatile by-products were produced per 100 grams of propionic anhydride.

*Example 11.*—A reaction mixture consisting of carbon monoxide, ethylene, propionic acid, water, and nickel carbonyl in the molar ratio of 1:1:0.8:0.2:0.06 was passed continuously through a reaction vessel at a temperature of 265° C. under a pressure of 600 atmospheres (reaction time ca. 16 minutes). The water was rapidly consumed, and 45% of the total acid (including that initially present plus that formed from water, carbon monoxide and ethylene) was converted to propionic anhydride in good yield.

In the copending applications S. N. 629,699, now Patent No. 2,448,368, and S. N. 625,951, now Patent No. 2,448,375, it is disclosed that organic acids may be obtained by reaction between olefin hydrocarbons, carbon monoxide and water in the presence of a nickel carbonyl catalyst under suitable conditions of temperature and pressure. In the practice of the present invention, it is possible to employ, as a starting material, the reaction product obtained in accordance with the aforesaid processes, provided the amount of water present in the said product is not sufficient to destroy the organic carboxylic acid anhydride produced in accordance with the present invention. In the preparation of the anhydrides directly from $H_2O$, CO, and olefins, under the temperature and pressure conditions disclosed herein, no anhydride is recovered until all of the water is converted to acid, i. e. the quantity of water initially present must be less than the quantity stoichiometrically required for the formation of carboxylic acid from the said olefin, carbon monoxide, and water.

The apparatus which may be employed in the practice of the present invention may be of any conventional type and, preferably is one in which the temperature of exothermic reactions can be readily controlled at the desired level. The process of the invention may be conducted either batchwise or continuously. At elevated temperatures and especially when a large excess of carbon monoxide is employed, the reaction evidently takes place in the vapor phase. Under such conditions, it is frequently desirable to have present in the reaction vessel a suitable absorptive material, such as silica gel or charcoal.

The apparatus employed in the practice of the invention may be made of or lined with any suitable inert material, such as glass, inert metals, copper, silver, silver-platinum alloys, and the like. In carrying out the process of the invention in a continuous manner tubular converters may be employed.

Various changes may be made in the method hereinbefore described without departing from this invention or sacrificing any of the advantages that may be derived therefrom.

It is to be understood that the expression "carboxylic acid" employed in the following claims refers to any organic compound having a —COOH group attached to carbon or hydrogen.

We claim:

1. A process for the synthesis of organic carboxylic acid anhydrides which comprises introducing into a pressure-resistant reaction vessel carbon monoxide, water, and an olefinic hydrocarbon of the formula $RR_1C=CR_2R_3$ in which R, $R_1$, $R_2$ and $R_3$ each represents a member of the class consisting of hydrogen and alkyl radicals, the quantity of the said water being less than the quantity stoichiometrically required for the formation of carboxylic acid from the said olefin, said carbon monoxide and water, and heating the resulting mixture at a temperature above 110° C. under a pressure within the range of 25 to 2000 atmospheres in the presence of a member of the class consisting of nickel carbonyls and substances which form a nickel carbonyl under the reaction conditions, whereby an organic carboxylic acid anhydride of the formula $(CHRR_1CR_2R_3CO)_2O$ is formed, and after a reaction time not exceeding one hour separating the said organic carboxylic acid anhydride from the resulting reaction mixture.

2. A process for the synthesis of organic carboxylic acid anhydrides which comprises introducing into a pressure-resistant reaction vessel carbon monoxide, water, an olefinic hydrocarbon of the formula $RR_1C=CR_2R_3$, and an organic carboxylic acid of the formula $R_4COOH$, in which R, $R_1$, $R_2$, $R_3$ and $R_4$ each represents a member of the class consisting of hydrogen and alkyl radicals, the quantity of the said water being less than the quantity stoichiometrically required for the formation of carboxylic acid from the said olefin, said carbon monoxide and water, and heating the resulting mixture at a temperature above 110° C. under a pressure within the range of 25 to 2000 atmospheres in the presence of a member of the class consisting of nickel carbonyls and substances which form a nickel carbonyl under the reaction conditions, whereby an organic carboxylic acid anhydride of the formula $CHRR_1CR_2R_3COOCOR_4$ is formed, and thereafter separating the said organic carboxylic acid anhydride from the resulting reaction mixture.

3. A process for the synthesis of organic carboxylic acid anhydrides which comprises introducing into a pressure-resistant reaction vessel carbon monoxide, water, propionic acid and an olefinic hydrocarbon of the formula $RR_1C=CR_2R_3$ in which R, $R_1$, $R_2$ and $R_3$ each represents a member of the class consisting of hydrogen and alkyl radicals, the quantity of the said water being less than the quantity stoichiometrically required for the formation of carboxylic acid from the said olefin, said carbon monoxide and water, and heating the resulting mixture at a temperature above 110° C. under a pressure within the range of 25 to 2000 atmospheres in the presence of a member of the class consisting of nickel carbonyls and substances which form a nickel carbonyl under the reaction conditions, whereby an organic carboxylic acid anhydride of the formula $CHRR_1CR_2R_3COOCOC_2H_5$ is formed, and thereafter separating the said organic carboxylic acid anhydride from the resulting reaction mixture.

4. A process for the synthesis of organic carboxylic acid anhydrides which comprises introducing into a pressure-resistant reaction vessel carbon monoxide, water, an olefinic hydrocarbon of the formula $RR_1C=CR_2R_3$ and an organic carboxylic acid of the formula $R_4COOH$, in which R, $R_1$, $R_2$ and $R_3$ each represents a member of the class consisting of hydrogen and alkyl radicals, the quantity of the said water being less than the quantity stoichiometrically required for the formation of carboxylic acid from the said olefin, said carbon monoxide and water, and heating the resulting mixture at a temperature of 200° to 350° C. under a pressure within the range of 25 to 2000 atmospheres in the presence of a member of the class consisting of nickel carbonyls and substances which form a nickel carbonyl under the reaction conditions, whereby an organic carboxylic acid anhydride of the formula $CHRR_1CR_2R_3COOCOR_4$ is formed, and thereafter separating the said organic carboxylic acid anhydride from the resulting reaction mixture.

5. A process for the synthesis of organic carboxylic acid anhydrides which comprises introducing into a pressure-resistant reaction vessel carbon monoxide, water, propionic acid and an olefinic hydrocarbon of the formula $RR_1C=CR_2R_3$ in which R, $R_1$, $R_2$ and $R_3$ each represents a member of the class consisting of hydrogen and alkyl radicals, the quantity of the said water being less than the quantity stoichiometrically required for the formation of carboxylic acid from the said olefin, said carbon monoxide and water, and heating the resulting mixture at a temperature above 110° C. under a pressure within the range of 25 to 2000 atmospheres in the presence of a nickel carbonyl catalyst, whereby an organic carboxylic acid anhydride of the formula $CHRR_1CR_2R_3COOCOC_2H_5$ is formed, and thereafter separating the said organic carboxylic acid anhydride from the resulting reaction mixture.

6. A process for the synthesis of propionic anhydride which comprises introducing into a pressure-resistant reaction vessel carbon monoxide, water, propionic acid, ethylene, and a catalytic quantity of a member of the class consisting of nickel carbonyls and substances which form a nickel carbonyl under the reaction conditions, the quantity of the said water being less than the quantity stoichiometrically required for the formation of carboxylic acid from the said ethylene, said carbon monoxide and water, and heating the resulting mixture at a temperature of about 200° to 350° C. under a pressure within the range of 25 to 2000 atmospheres whereby propionic anhydride is formed, and thereafter separating the said propionic anhydride from the resulting reaction mixture.

7. The process of claim 6 in which the said nickel-containing catalyst is nickel carbonyl.

8. The process of claim 6 in which the said nickel-containing catalyst is nickel propionate.

9. The process of claim 6 in which the said nickel-containing catalyst is nickel formate.

10. The process of claim 6 in which the reaction time is not in excess of one hour.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,924,767 | Carpenter | Aug. 29, 1933 |
| 1,973,662 | Schalch | Sept. 11, 1934 |
| 2,020,689 | Larsen | Nov. 12, 1935 |
| 2,054,865 | Oxley et al. | Sept. 22, 1936 |
| 2,448,368 | Gresham et al. | Aug. 31, 1948 |

OTHER REFERENCES

Advances in Acetylene Chemistry as Developed by Walter Reppe, Intelligence Division Report No. 4149, dated March 24, 1945, p. 26.

Peck et al.: Fiat Final Report No. 273, interview with Dr. W. J. Reppe, dated October 2, 1945, p. 10.